Patented Apr. 3, 1923. 1,450,194

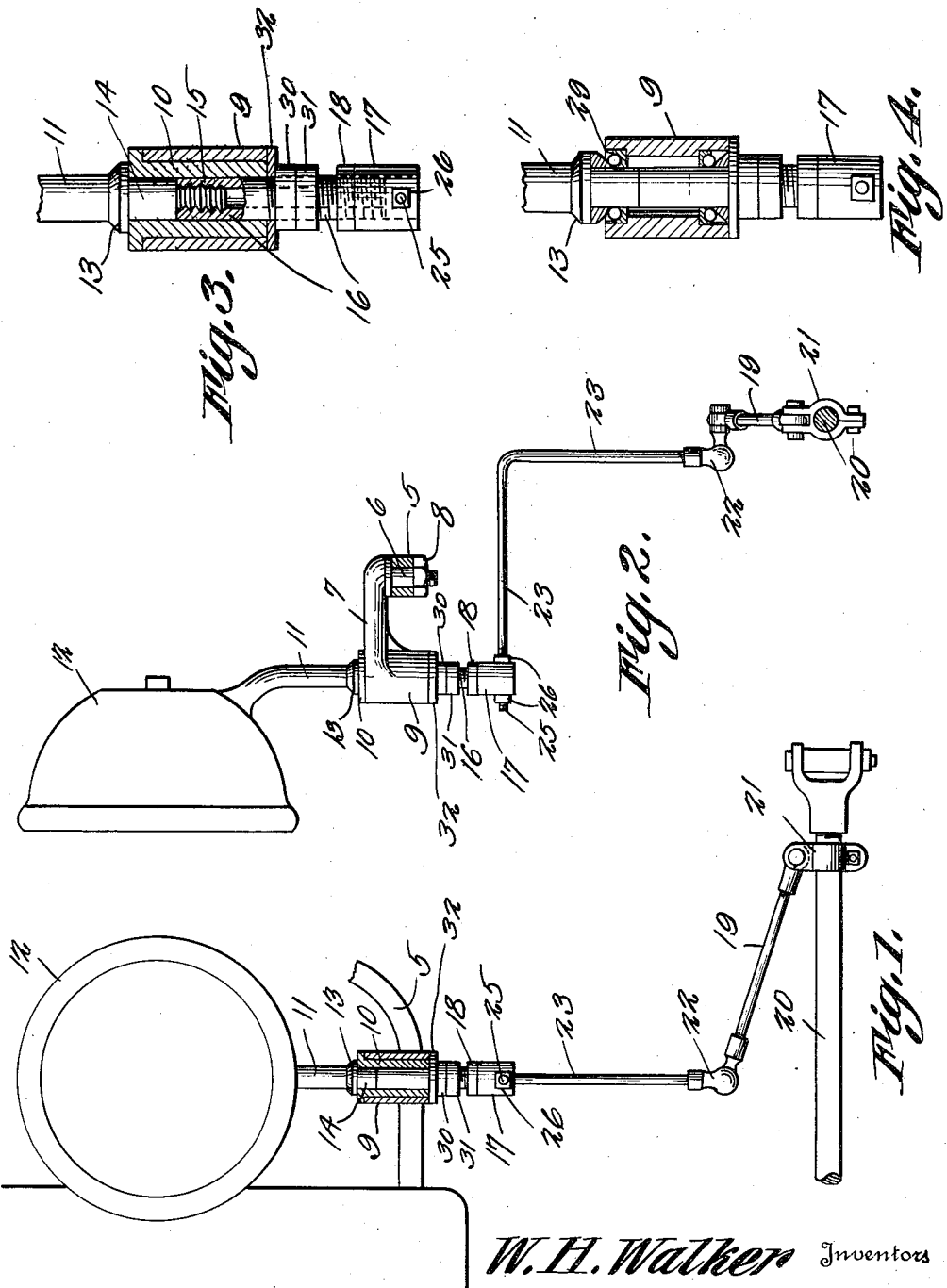

UNITED STATES PATENT OFFICE.

WILLIAM H. WALKER AND HOBART GOFF, OF PARSONS, TENNESSEE.

DIRIGIBLE HEADLIGHT.

Application filed July 11, 1921. Serial No. 483,863.

*To all whom it may concern:*

Be it known that we, WILLIAM H. WALKER and HOBART GOFF, citizens of the United States, residing at Parsons, in the county of Decatur, State of Tennessee, have invented a new and useful Dirigible Headlight, of which the following is a specification.

The present invention has reference to dirigible headlights, the primary object of the invention being to provide a headlight of this character which may be readily and easily applied to vehicles, the structure being such as to permit the device to be supported by the usual lamp brackets, now in use.

A further object of the invention is to provide a novel bearing employed as the support for the lamp, whereby the lamp will respond readily to movements of the connecting rod to which the device is connected.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is an elevational view of a headlight constructed in accordance with the present invention, the bearing being shown in section.

Figure 2 is a side elevational view of a lamp showing the same as connected to the usual connecting rod of a vehicle.

Figure 3 is a fragmental detail view partly in section, disclosing the bearing or lamp support.

Figure 4 is a fragmental detail view of a modified form of the invention, the same being shown partly in section.

Referring to the drawing in detail, the reference character 5 designates a portion of a vehicle which is provided with an opening to accommodate the right angled end 6 of the lamp bracket 7, there being provided a nut 8 positioned on one end of the right angled portion 6 to secure the same in position.

The bracket 7 is provided with a head 9 in which is positioned a bearing 10 which in turn supports the lamp supporting arm 11 which is secured to the lamp 12 in any suitable manner. The supporting arm 11 is provided with a circumferential flange 13 resting on the bearing member 10, the arm being provided with a reduced portion 14 and a threaded portion 15, which threaded portion is positioned in one end of the hollow shaft 16, to connect the arm 11 and the coupling 17, which coupling is locked to the shaft 16 as by means of the lock nut 18.

The operating means includes an arm 19 which is connected with the usual connecting rod 20 that connects the stub axles of a motor vehicle, the connection between the arm 19 and connecting rod 20 being made through the member 21 which may be adjusted along the rod 20 to meet the requirements of their usage.

A ball and socket joint indicated at 22 has connection with the arm 19 and connects the operating arm 23 thereto, which operating arm 23 is provided with a right angled portion 24 which is threaded as at 25, the threaded portion being passed through an opening in the coupling 17 where the same is secured in such position as by means of the nuts 26.

Positioned on the shaft 16 is an adjusting washer 30 and a lock washer 31, the washers 30 and 31 being designed for the purpose of supporting the washer 32 against the lower edge of the head 9 to secure the arm 11 within the bearing member 10 in a manner to allow rotary movement thereof.

In the modified form of the invention, the bearing member 10 has been supplemented by the bearings 29, which are of the ball type and are shown as positioned in the head 9. This form of invention is shown as a suggestion to facilitate the use of the invention on exceptionally large vehicles, where exceptionally large lamps are used.

From the foregoing it will be seen that as the connecting rod 20 is moved to accomplish the steering of a vehicle, the lamps associated with the vehicle will move correspondingly to illuminate the path of travel of the vehicle. While I have shown and described a single lamp, it is to be understood that a lamp of this structure is to be employed where the usual headlights are supported, at each side of the vehicle.

Having thus described the invention, what is claimed as new is:—

In combination with the connecting rod connecting the front wheels of a motor vehicle, a dirigible head lamp comprising a bracket, a tubular bearing positioned in the bracket, a hollow shaft having a threaded portion, a coupling in the lower end of the shaft and having an opening, a rod extending through the opening for operating the hollow shaft within the bracket member, a lamp supporting arm having a threaded extension adapted to be positioned in the threaded portion of the hollow shaft, said lamp supporting arm having a flange adapted to rest on the upper end of the bearing member to hold the lamp supporting arm against movement vertically, and means for connecting the rod and connecting rod, whereby movement of the connecting rod will result in a relative movement of the lamp supporting arm.

In testimony that we claim the foregoing as our own, we have hereto affixed our signatures in the presence of two witnesses.

WM. H. WALKER.
HOBART GOFF.

Witnesses:
C. V. MAXWELL,
J. C. LONG.